(No Model.) 2 Sheets—Sheet 1.
W. W. BURSON.
SHEAF CARRIER FOR SELF BINDING HARVESTERS.
No. 391,451. Patented Oct. 23, 1888.
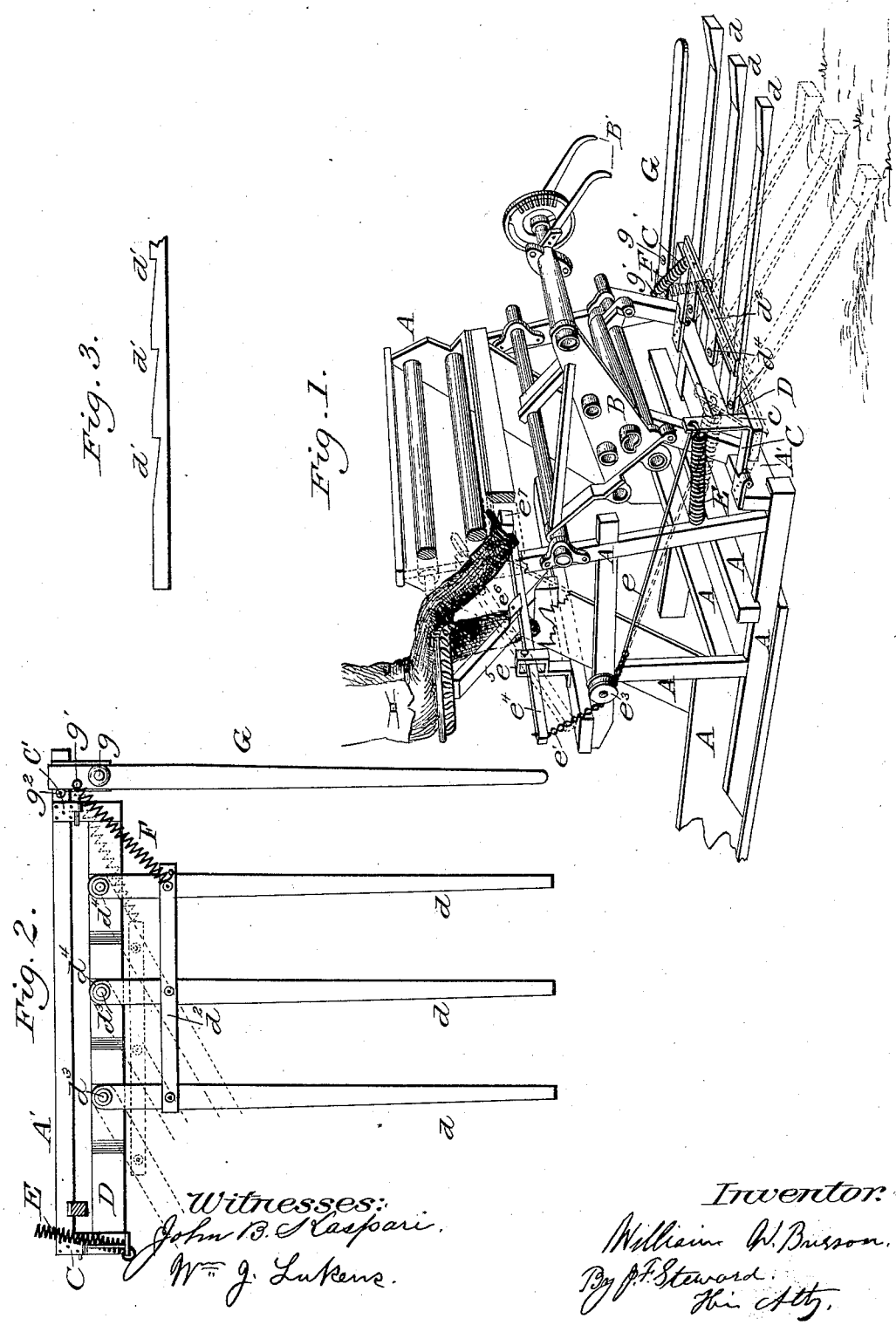
Witnesses:
John B. Kaspari.
Wm J. Lukens.
Inventor:
William W. Burson.
By J. F. Steward.
His Atty.

(No Model.) 2 Sheets—Sheet 2.
W. W. BURSON.
SHEAF CARRIER FOR SELF BINDING HARVESTERS.
No. 391,451. Patented Oct. 23, 1888.
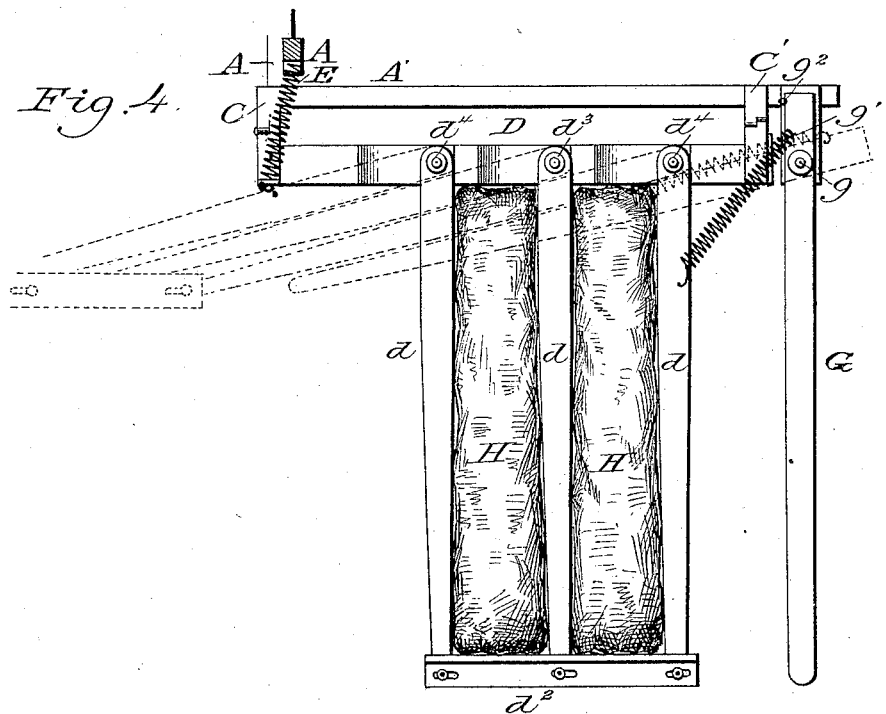
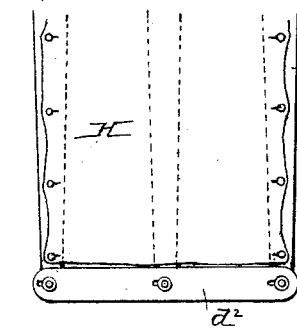
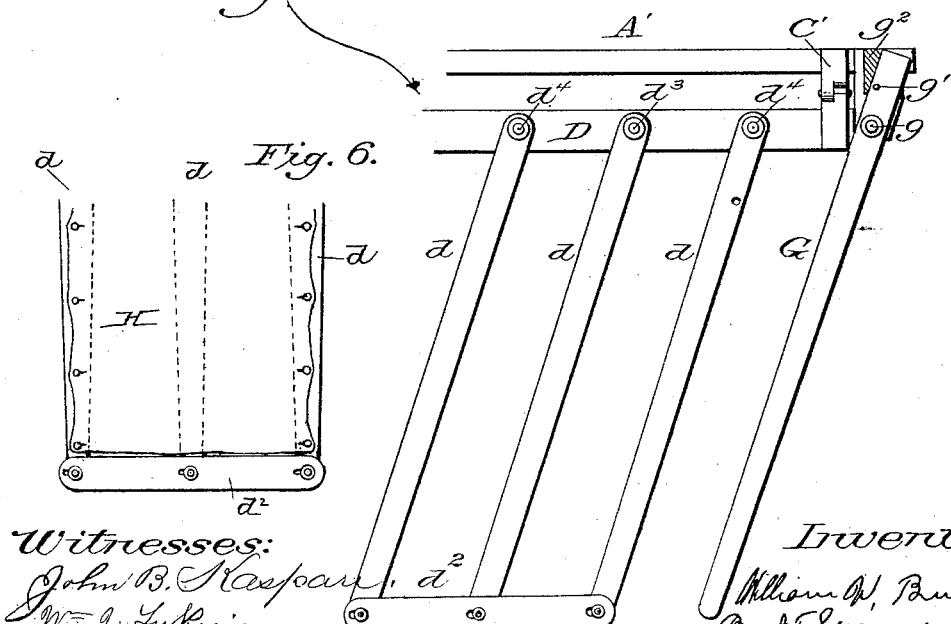
Witnesses:
John B. Kaspar
W. J. Lukens
Inventor:
William W. Burson
By J. F. Steward
His Atty.

UNITED STATES PATENT OFFICE.

WILLIAM W. BURSON, OF CHICAGO, ILLINOIS, ASSIGNOR, BY MESNE ASSIGNMENTS, TO WILLIAM DEERING, OF SAME PLACE.

SHEAF-CARRIER FOR SELF-BINDING HARVESTERS.

SPECIFICATION forming part of Letters Patent No. 391,451, dated October 23, 1888.

Application filed January 11, 1884. Serial No. 117,189. (No model.)

*To all whom it may concern:*

Be it known that I, WILLIAM W. BURSON, of Chicago, in the county of Cook and State of Illinois, have invented certain new and useful Improvements in Sheaf-Carriers for Grain Harvesting and Binding Machines, of which the following is a specification.

At the present day automatic grain harvesting and binding machines are commonly provided with carriers adapted to receive the bundles as they are delivered one at a time from the binding mechanism until they have accumulated in considerable numbers, when they are all discharged at one operation. It is to this class of appliances that my invention relates, and it is the aim of the invention to provide a simple, inexpensive, and durable carrier which shall be free from the objections incident to those heretofore in use, which shall admit of the machine passing through gates or other restricted openings, as usual, and which shall discharge the sheaves quickly and with easy action. To this end I provide a carrier consisting of a series of receiving fingers or arms, which in their normal position extend below and beyond the binding mechanism at right angles to the line of travel of the machine, or substantially so, in position to receive the sheaves as they fall from the binder. I mount the series of fingers in such manner that they may be lowered at the outer ends at the will of the driver, in order that the accumulated sheaves may roll or slide over the depressed ends. These fingers are further mounted in such manner that they may swing rearward around individual axles at the inner ends, this movement allowing the fingers, when in a depressed position, to trail rearward and with a lateral motion from under the escaping sheaves, and also permitting them to close compactly together in a position parallel or substantially parallel with the side of the machine, enabling the machine to pass through gates or other restricted openings, and preventing the fingers from being broken or strained in the event of their encountering obstructions at any time. I connect the fingers having a downward motion and a rearward and inward motion, as described, in such manner that they are compelled to move in unison, and I combine with them devices through which they may be retained in a receiving position.

I am aware that attempts have heretofore been made to produce sheaf-carriers with laterally-extended sheaf-receiving arms or fingers, as represented in Letters Patent of Gage, No. 282,303, dated July 31, 1883, and the patent of Burnham, No. 11,688, dated September 18, 1854. The Gage carrier consists of two laterally-extending fingers individually hinged that they may swing upward and rearward to pass obstructions, the rear finger being combined with a device by which it may be swung rearward away from the other to permit the bundle to fall through between them. This carrier differs from that claimed as my invention in the important particulars that its fingers cannot under any circumstances drop at the outer ends to discharge the bundles over them, that the fingers are not connected to move in unison, and that the forward finger is provided with a head-piece, *l*, which prevents the bundle from being discharged otherwise than between the fingers. The Burnham carrier consists of two rock-shafts, the outer ends of which are bent laterally and the journals of which are mounted in horizontal parallel boxes lying at right angles to the line of travel. The shafts are coupled together, so that their ends may be turned upward to receive the sheaf, and then by a partial rotation turned downward and rearward to admit of the sheaf sliding off over their ends. This organization differs from that claimed by me in that its arms do not and cannot swing rearward with a motion toward the machine or toward each other, in that the fingers cannot close together against the side of the machine or trail laterally from beneath the bundles, and also in that the ends of the arms are projected a constant distance beyond the side of the machine, and are incapable of yielding or swinging in any manner which will lessen the width of the machine or enable them to yield toward the machine when obstructions are encountered.

In the accompanying drawings, Figure 1 is a perspective view of the frame-work of a self-binding harvester with my carrier applied thereto as viewed from the rear stubble-corner. Fig. 2 is a top plan view of the carrier and the end bar of the main frame, to which it is attached. Fig. 3 is a view of one of the parts of the carrier. Figs. 4, 5, and 6 are top plan views of the carrier in modified forms.

In the drawings, the parts A A' represent the frame-work of the harvester proper; B, the binder-frame mounted thereon; B', the rotary discharge-arms of the binder attachment by which the bundles are ejected and delivered upon my carrier. To the end bar or sill, A', is connected by hinges C C' the bar or carrier-head D, extending in a fore-and-aft direction and adapted to turn upward and downward on the hinges. An arm, c, extending upward from the rear end, is connected to one end of a spring, E, which is attached at its opposite end to the harvester-frame and serves to hold the bar D normally in the position shown. The carrier-arms $d$ $d$ are connected individually at their inner ends by pivots $d^3$ to the top of the bar D, so that their outer ends may swing forward and backward. The arms or fingers $d$ extend outward normally below and beyond the binder, as shown in Fig. 1, in position to receive the sheaves as they are delivered from the binder. As they are supported wholly by the bar D, their outer ends may be raised or lowered by turning the bar on its hinges. When the bar is in the elevated position shown in Fig. 1, the fingers are in a horizontal or substantially horizontal position and at a considerable height from the ground; but as the bar is turned downward the outer ends of the fingers are depressed, as shown in dotted lines, so that the sheaves may escape over them.

In order to give the attendant control of the position of the fingers, I connect a rod, $e$, to the upright arm $c$ and to a chain, $e'$, which is passed under a guide-pulley, $e^3$, to the rear end of a lever, $e^4$, which is in turn pivoted at $e^5$ to the harvester-frame, with its forward end, $e^7$, in position to be conveniently depressed by the foot of the driver riding on the machine, as usual. On the edge of the seat-standard I secure a block or shoulder, $e^6$, under which the lever may engage to sustain the carrier in its elevated position. The upper surface of the bar D is provided with inclined gains $d'$, in which the pivoted ends of the fingers $d$ are seated, as shown, so that the front edge of each tooth abuts against the vertical shoulder of the gain, whereby it is prevented from swinging forward beyond its proper position. The pivots $d^3$ are commonly provided with washers $d^4$, resting on top of the fingers and giving an extended bearing-surface, so that the fingers may not work loose. Near their inner ends I connect the arms or fingers $d$ by a cross-bar, $d^2$, united thereto by vertical pivots or bolts, this line of pivots being parallel with the line of pivots $d^3$. Being thus applied, the cross-bar $d^2$ compels the fingers $d$ to move in unison, keeps them at all times parallel, and gives to the entire structure increased rigidity. At their outer ends the fingers $d$ are thickened or formed with upwardly-inclined surfaces, the better to adapt them to retain the sheaves thereon.

To the forward fingers, $d$, I connect a spring, F, which tends to hold the fingers forward in their normal position. At the forward end of the carrier a guard bar or finger, G, located at a slightly higher level than the fingers $d$, is connected by an upright pivot to a support on the sill of the harvester-frame. The finger thus pivoted is free to swing backward when it encounters an obstruction, but is prevented from tipping downward. This bar serves to prevent the bundles from jarring forward on the carrier when the machine is traveling down-hill or when it is tilted forward. I connect the spring F to the inner end of this bar G, so that it tends to hold the bar in the position shown and to return it to such position after it has been turned rearward.

If desired, shallow canvas troughs for returning the shelled grain may be attached to and between the arms $d$, as shown in Fig. 4. These troughs should be sufficiently slack to permit the free movement of the arms.

In some cases it may be desirable to place the connecting-bar $D^2$ at the outer ends of the carrier-fingers, as shown in Figs. 4 and 5. In some cases it may be desirable to arrange the fingers to stand normally at a slight rearward inclination, as shown in Fig. 5. The troughs H may be detachably connected to the carrier-arms by buttons, as shown in Fig. 6, or equivalent fastenings.

The operation of my carrier is exceedingly simple. The parts stand normally in the positions shown in Figs. 1 and 2. The bundles delivered from the binder are received upon and retained by the fingers $d$. When a sufficient number have accumulated, the driver disengages the trip-lever $e^4$ from the locking device, thereby permitting the bar D to turn downward and the outer ends of the fingers $d$ to fall toward the ground, that the bundles may roll from their outer ends. When the fingers have descended a sufficient distance to permit it, they will, through contact with the ground or the stubble, or from the resistance offered by the bundles as the latter lie upon the ground, swing to the rear, folding inward toward the machine and toward each other in the manner represented by dotted lines in Fig. 2. In this manner the fingers closing compactly together are enabled to trail smoothly with a lateral motion from beneath the bundles and to pass over the surface without being subjected to strain or resistance. When the fingers are relieved from the weight of the bundles, they are lifted and swung forward by the springs to their original position, their elevation being assisted, if necessary, by the action of the foot-lever, which is then fastened in place to lock the fingers in their elevated position. The inclination of the gains $d'$ admits of the fingers being turned rearward sufficiently to overlap each other.

It is to be noted that in my carrier the fingers are individually mounted on upright axes, that they may swing rearward and inward at the outer end.

It is to be further noted that the horizontal axis between the frame and the fingers permits the latter to fall at their outer ends below the horizontal or receiving position, so that they have for the time being a downward inclination.

In passing stumps, stones, guide-posts, or other obstructions the fingers are free to yield and swing rearward, and in so doing they turn inward toward the machine, thereby reducing the width of the machine, so that it may pass through openings sufficient to admit an ordinary machine.

I believe myself to be the first to produce a bundle-carrier consisting of a series of lateral fingers or arms each supported by pivotal connections, which admit of the outer ends of the fingers being depressed, and also being carried rearward toward the machine; the first to provide a sheaf-carrier composed of laterally-extending fingers jointed to the machine, so that their outer ends may be depressed, and that while depressed or resting upon the ground they may swing rearward toward the machine and toward each other; the first to so arrange or joint the laterally-projecting fingers in a sheaf-carrier that they may be changed from a position in which they are at right angles to the machine to a position in which they trail with a downward inclination to the rear nearly together at the side of the machine; the first to so construct and connect a series of sheaf-receiving fingers which project laterally beyond the machine, that they may swing rearward and inward in unison without presenting any obstruction to the passage of the bundles over their outer ends, and the first to produce a carrier composed of a series of fingers, each of which fingers may move from an elevated position at right angles to the machine to a position in which the outer end is lowered farther to the rear and nearer to the side of the machine.

It is evident that the movement of the carrier-fingers, both downward and rearward, may be obtained by means other than those specifically described herein without departing from the principle of my invention.

Having thus described my invention, what I claim is—

1. In combination with a grain harvesting and binding machine, a sheaf-carrier composed of a series of laterally-projecting sheaf-receiving fingers hinged thereto, as described, so as to swing downward and then rearward and inward toward the machine, whereby they are enabled through the falling motion to deliver the sheaves over their ends, and by their rearward and inward motion to trail laterally from beneath the escaping sheaves, and also to yield toward the machine when obstructions are encountered.

2. In combination with a grain-binding machine, a sheaf-carrier having a series of laterally-extended fingers carried by a rocking bar, whereby they are adapted to fall at their outer ends, said fingers being independently pivoted on the bar, so as to be free to swing rearward and inward.

3. In combination with a grain harvesting and binding machine, a sheaf-carrier consisting of a series of receiving-fingers extending laterally beyond the machine, substantially vertical pivots on which the fingers are individually mounted to swing rearward and inward toward the machine, and a cross-bar connecting the fingers to compel their movement in unison.

4. The combination, with a grain harvester and binder, of a sheaf-carrier composed of the vertically, rearwardly, and inwardly swinging fingers, a bar connected to each of said fingers and connecting them all together, and a spring connected at one end with the fingers and at the other with the machine and tending to swing said fingers forward, whereby the fingers are restored automatically to their normal positions on being lifted clear of the stubble or other obstructions.

5. In a sheaf-carrier, the rocking bar D, the laterally swinging fingers $d$, jointed thereto, the bar $d^2$, connecting said fingers, and the spring E, connecting the cross-bar $d^2$ with the frame, all combined substantially as described.

6. The rocking bar D and its arm C, the spring connecting said arm to the harvester-frame, the rearwardly-swinging carrier-fingers individually pivoted to the bar, the connecting-bar jointed to the fingers, and the spring connecting the last-named bar with the frame, all combined substantially as described.

7. In combination with a sheaf-carrier pivoted upon an axis parallel with the line of advance of the machine, a rearwardly-yielding guard-bar independently pivoted upon the harvester at the forward end of said carrier.

8. The rearwardly-swinging guard-bar, in combination with the vertically and laterally swinging carrier-fingers.

9. In combination with a grain-binding harvester, a rocking bar mounted thereon, a series of sheaf-receiving fingers extending laterally from said bar and individually pivoted thereto to swing rearward and inward, an arm or lever adjacent to the driver's seat, and a connection from said arm to the rock-bar, whereby the operator is enabled to control the rocking motion of the bar, and thus raise or lower the outer ends of the fingers.

10. In combination with a grain-binding harvester, a rocking bar, D, a series of laterally-extending sheaf-receiving fingers, $d$, individually pivoted thereto to swing to the rear, a connection, E, extending from the bar to a point adjacent to the driver's seat, an operating arm or lever attached to said connection, and a locking device to hold said lever, whereby the sheaf-receiving fingers may be locked in their elevated positions.

11. In a sheaf-carrier, the horizontal rocking bar D, formed with the gains, each presenting an inclined surface and an upright shoulder, in combination with the horizontal outreaching fingers seated in said gains, and upright pivots on which the fingers are individually mounted, whereby the fingers are permitted to swing rearward and downward, but prevented from turning forward of the receiving position.

WILLIAM W. BURSON.

Witnesses:
JOHN F. STEWARD,
JOHN B. KASPARI.